United States Patent [19]

Kempa

[11] Patent Number: 4,946,745
[45] Date of Patent: Aug. 7, 1990

[54] NOVELTY STATUE

[76] Inventor: John Kempa, 69 Nugent Ave., Staten Island, N.Y. 10305

[21] Appl. No.: 347,206

[22] Filed: May 4, 1989

[51] Int. Cl.$^5$ .......................... A63H 3/38; A63H 3/40
[52] U.S. Cl. ................................ 428/542.2; D11/102; 40/416; 272/8 N; 446/310; 446/392
[58] Field of Search ..................... 40/409, 411, 416; 272/8 N; 446/310, 392; 428/919, 542.2, 913; D11/102, 133

[56] References Cited

U.S. PATENT DOCUMENTS

| | | | |
|---|---|---|---|
| D. 8,573 | 8/1875 | Crisand | D11/133 |
| D. 226,012 | 1/1973 | Black, Jr. | D11/160 |
| D. 235,887 | 7/1975 | Moncada | D11/160 |
| D. 260,866 | 9/1981 | Richards | D11/160 |
| D. 265,470 | 7/1982 | Fritzke | D11/131 |
| D. 265,471 | 7/1982 | Lanahan | D11/133 |
| 689,669 | 12/1901 | Derus | D11/54 X |
| 2,791,853 | 5/1957 | Coons et al. | 40/416 |
| 3,081,997 | 3/1963 | Glass et al. | 272/8 N |
| 3,471,965 | 10/1969 | Glass et al. | 272/8 N X |
| 3,655,325 | 4/1972 | Toppel | 272/8 N |
| 3,916,548 | 11/1975 | Langer | 40/409 |
| 3,921,911 | 11/1975 | Sheets | 428/919 X |
| 4,647,510 | 3/1987 | Mandarano et al. | 446/392 X |
| 4,828,531 | 5/1989 | Kuhn | 446/392 |

*Primary Examiner*—Henry F. Epstein
*Attorney, Agent, or Firm*—Terry M. Gernstein

[57] ABSTRACT

A novelty statue includes a figure that is adapted to move in response to a noise or in response to a sensed temperature. The figure is in the shape of either a human eye which blinks or in the shape of a letter I which moves into and out of a base.

7 Claims, 3 Drawing Sheets

NOVELTY STATUE

TECHNICAL FIELD OF THE INVENTION

The present invention relates to the general art of novelty items and to the particular field of novelty statues.

BACKGROUND OF THE INVENTION

The prime objective of most novelty items is to capture and hold a viewer's interest. While a statue often captures a viewer's interest, most of the known statues are not successful in holding such interest.

Accordingly, there is a need for a statue-type novelty item that captures and holds a viewer's interest.

OBJECTS OF THE INVENTION

It is a main object to provide a statue that captures and holds viewer's attention.

It is another object of the present invention to provide a statue that uses moving parts to capture and hold attention.

SUMMARY OF THE INVENTION

These, and other, objects are accomplished by a statue that has an I-shaped figure or an eye-like figure on a base and which has that figure move in response to a sharp noise or in response to a predetermined amount of heat, such as the amount of heat sensed by the statue when it is held in a viewer's hand.

The I-shaped figure moves into and out of the base, and the eye-like figure blinks.

DETAILED DESCRIPTION OF THE PREFERRED EMBODIMENT OF THE INVENTION

Figure 1:
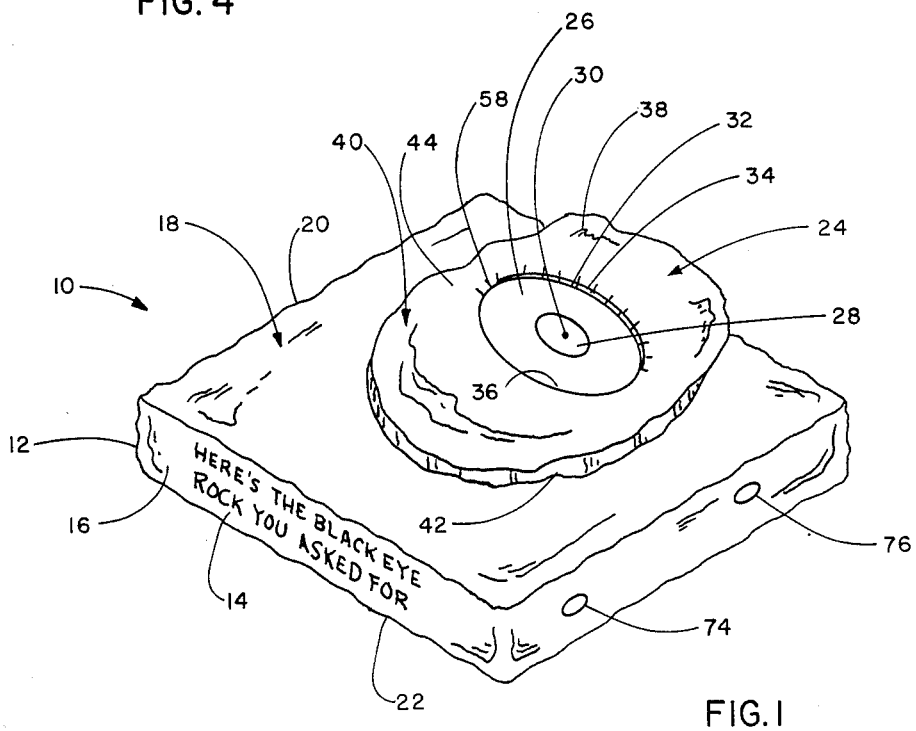
FIG. 1 is a perspective showing a statue having an eye-like figure on a base, with the eye-like figure in the open configuration.

Shown in FIG. 1 is a novelty statue 10 that is adapted to capture and hold a viewer's attention. The statue 10 includes a block-like base 12 having attention-capturing and double entendre'-type indicia 14 on one of the sides thereof, such as side 16. The base is polygonal, such as square or rectangular, and has a top surface 18 that is configured to have a jagged appearance such as by having a multiplicity of irregularities, such as irregularity 20 that is intended to appear to be a small pebble or the like. The sides also have a jagged appearance. The base includes a bottom 22 that is adapted to rest on a support surface. The bottom also is configured to appear jagged.

The statue 10 also includes a FIG. 24 that is shaped and configured to resemble a human eye having an eyeball 26, an iris 28 and a pupil 30. The FIG. 24 also includes an eyelid 32 having eyelashes 34, a lower eyelid 36 and an eyebrow 38. The FIG. 24 is set in a support 40 that is shaped and configured to resemble a rock resting on a rocky terrain suggested by the base top surface 18. The support 40 thus includes an irregular sidewall 42 and an irregular top surface 44

Figure 2:
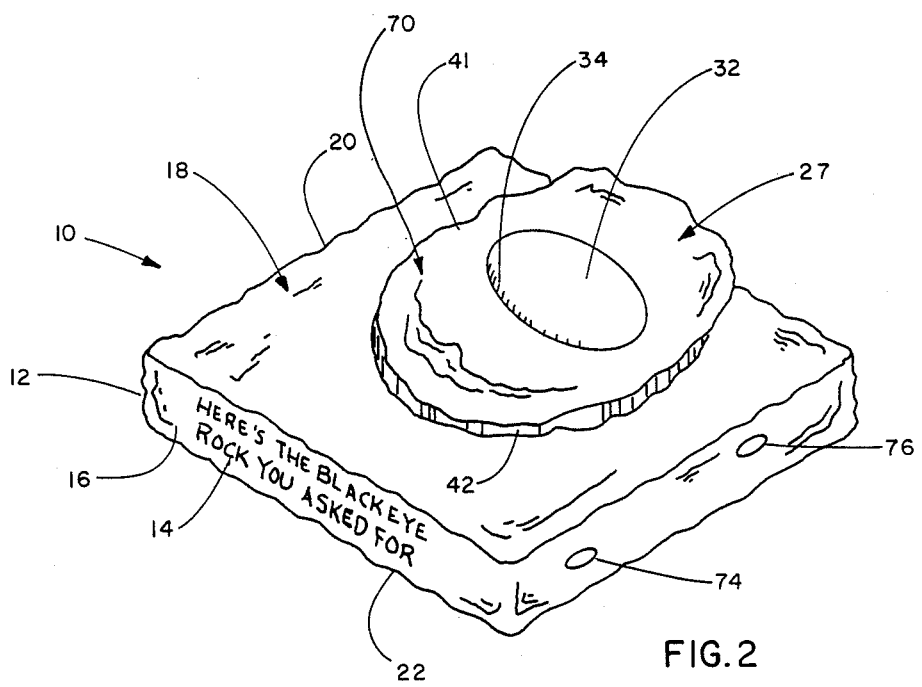
FIG. 2 is a perspective showing the FIG. 1 statue having the eye-like figure in the closed configuration.

The statue FIG. 24 is adapted to blink. Thus, the statue 10 includes a system and mechanism for moving the eyelid 32 from the FIG. 1 eye-uncovering position to the FIG. 2 eye-covering position. The mechanism is adapted to blink the eye upon sensing a noise of a predetermined level or upon sensing a temperature of a predetermined level. The noise that causes the eye to blink is that sensed by the statue when a human claps in close proximity thereto, and the temperature is that which would be sensed when the base is touched by a human. Accordingly, the eyelid moving mechanism and system is adapted to blink when a noise of about 50 db is sensed at the base and/or when a temperature of about 98° F. is sensed by the base.

The mechanism is designed to cause the eye to blink once upon sensing such operating key, and then to return to the FIG. 1 position to be operated again only upon sensing another key. Thus, a single clap will cause the eye to move from the FIG. 1 position to the FIG. 2 position and back to the FIG. 1 position and then stop. Likewise picking the statue up by the base will cause the same cycle to occur with the eyelid stopping in the FIG. 1 position after moving from the FIG. 1 position, to the FIG. 2 position and back to the FIG. 1 position.

Figure 3:
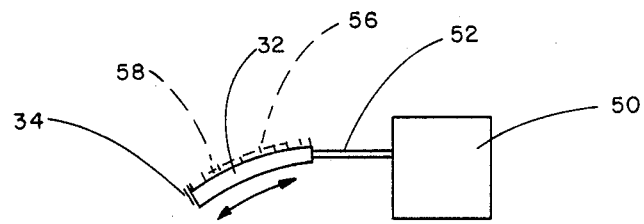
FIG. 3 is a schematic of a motor system used in causing the FIG. 1 eye-like figure to blink.

The mechanism used to move the eyelid is shown schematically in FIG. 3 as including a motor 50 which is mounted in the base and which includes a motor arm 52 attached to the eyelid 32. The eyelid is mounted on the statue to move in the direction indicated in FIG. 3 by double-headed arrow 54 which corresponds to the above-described blinking movement. The eyelid includes keys, such as key 56 that is slidably mounted in tracks, such as track 58 defined in the support 40. The motor control system will be discussed below.

Figure 4:
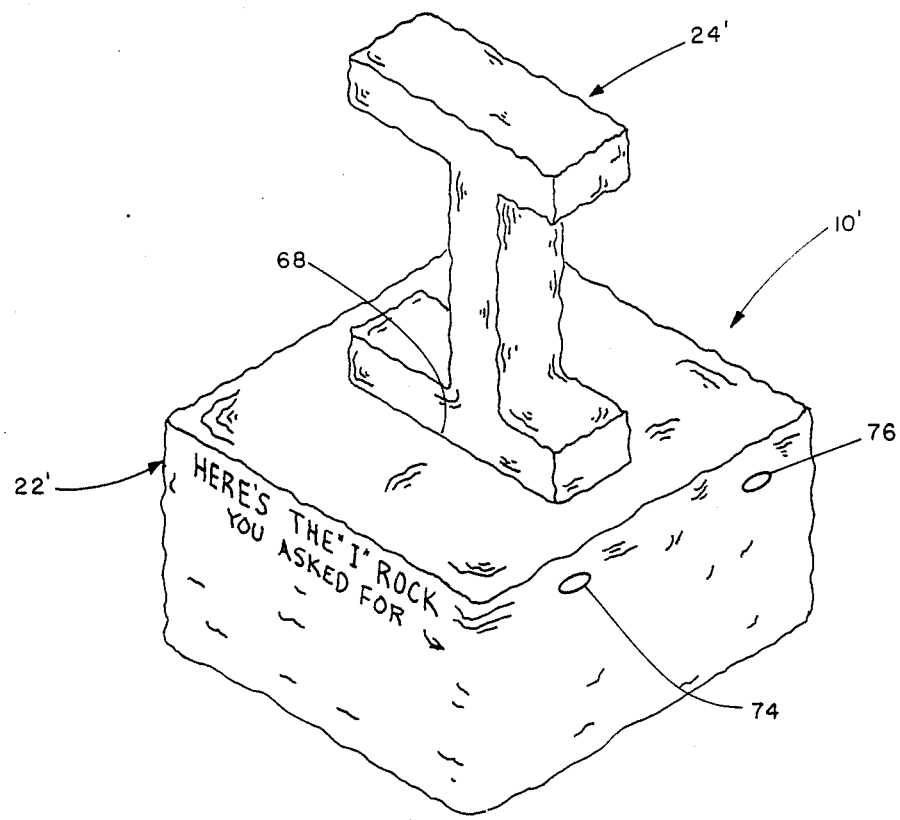
FIG. 4 is a perspective showing the statue having an I-shaped figure on a base.
Figure 5:
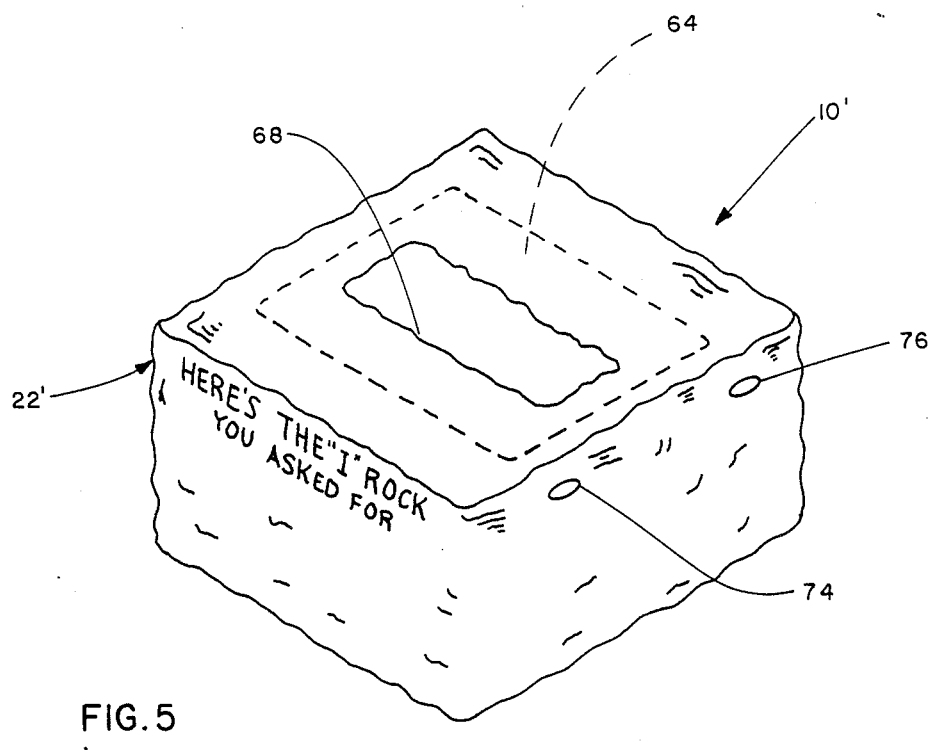
FIG. 5 is a perspective of the FIG. 4 statue showing the I-shaped figure inside a base chamber.
Figure 6:
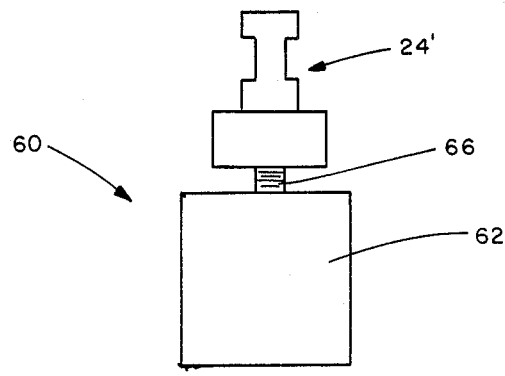
FIG. 6 is a schematic of a system for moving the I-shaped figure into and out of the base of the statue.

An alternative embodiment of the statue is shown in FIGS. 4–6. The alternative embodiment includes a statue 10' that has an I-shaped figure 24' in place of the eye-like figure 24. The statue 10' includes a base 12' that is similar in appearance to the base 12, except that it is deeper as measured between the top surface 18 and the bottom surface 22 thereof. The reason for such increased depth is to accommodate the I-shaped figure 24', as will be evident from the ensuing discussion.

The figure 24' is mounted to move from the FIG. 4 raised position to the FIG. 5 hidden position by a mechanism 60 that includes a motor 62 mounted in a chamber 64 to support the figure 24' on a motor arm 66 that moves up and down upon actuation of the motor 62. The figure 24' moves through a slot 68 defined in the top surface of the base when roving between the FIG. 4 display position and the FIG. 5 hidden position.

As is the case with the figure 24, the figure 24' is adapted to make one complete cycle upon the occurrence of a noise and/or upon the occurrence of the statue being touched. The cycle is preferably from the FIG. 5 hidden position to the FIG. 4 display position and back to the FIG. 5 hidden position; however, the cycle can begin and end with the FIG. 4 display position if desired.

Figure 7:
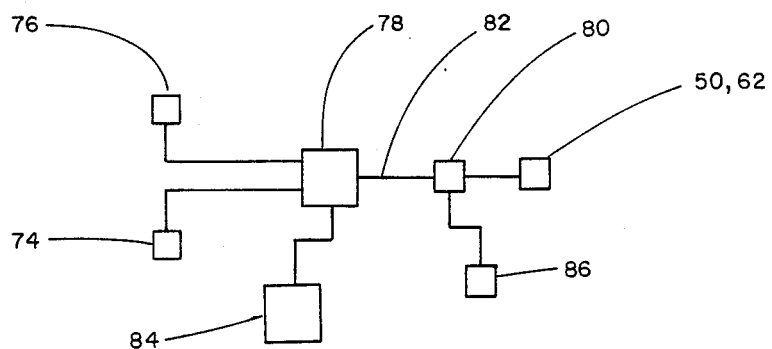
FIG. 7 is a schematic of an operating system for the motors used to blink the eye-like figure of FIG. 1 or to move the I-shaped figure of FIG. 3.

Operation of the motors for figures 24 and 24' is controlled by system similar to those used in the key chains that emit a signal, either audible or visible, when someone claps to assist in finding the key chain. Thus, referring to FIG. 7, the control system for motors 50 and 62 includes a noise sensor 74, such as a microphone or the like, and a temperature sensor 76, such as a thermocouple or the like, mounted in the base of the statue. The sensors are connected to a signal amplifier 78 and to a switch 80 by leads, such as lead 82. The switch is a normally open switch and closes to connect a power source 84 to the motor upon being actuated by a signal from the amplifier 78. The system further includes a control element 86 that opens the switch 80 after one cycle of the motor. The power source is preferably a battery, but can also be a cord connected to a source of utility power or the like if suitable.

The figures 24 and 24' can be any suitable color and combination of colors.

It is to be understood that while certain forms of the present invention have been illustrated and described herein, it is not to be limited to the specific forms or arrangement of parts described and shown.

I claim:
1. A statue comprising:
(A) a base;
(B) a figure mounted on said base, said figure being in the shape of a human eye;
(C) an eyelid-like element being movably mounted on said figure;
(D) means for moving said eyelid-like element in a blinking movement, said means including
  (1) a power source,
  (2) a motor attached to said eyelid-like element to move said eyelid-like element between an eye covering position and an eye uncovering position,
  (3) control means connecting said motor to said power source, said control means including
    (a) a normally open switch connecting said motor to said power source when it is closed to move said eye-lid element from said eye uncovering position to said eye covering position and back to said eye uncovering position during one cycle of said motor,
    (b) a noise sensor connected to said normally open switch to close said switch and connect said motor to said power source when a noise above a prescribed level is sensed by said noise sensor, said noise sensor including a microphone in said base and a signal amplifier,
    (c) a heat sensor in said base and connected to said normally open switch to close said switch when that heat sensor is exposed to a temperature above a prescribed level, and
    (d) a control element connected to said normally open switch to open said switch after that switch has been closed and said motor has completed one cycle.
2. The statue defined in claim 1 wherein said prescribed noise level is about 50 db.
3. The statue defined in claim 2 where said prescribed temperature level is about 98° F.
4. The statue defined in claim 3 wherein said heat sensor includes a button on said base.
5. A statue comprising:
(A) a base;
(B) a figure mounted on said base, said figure being in the shape of a block I;
(C) a chamber in said base which accommodates said figure;
(D) means for moving said figure into and out of said chamber, said means including
  (1) a power source,
  (2) a motor attached to said figure to move said figure between a first position located inside said chamber and a second position in which most of said figure is located outside said chamber,
  (3) control means connecting said motor to said power source, said control means including
    (a) a normally open switch connecting said motor to said power source when it is closed to move said figure between said first position and said second position and back to said first position during one cycle of said motor,
    (b) a noise sensor connected to said normally open switch to close said switch and connect said motor to said power source when a noise above a prescribed level is sensed by said noise sensor, said noise sensor including a microphone in said base and a signal amplifier,
    (c) a heat sensor in said base and connected to said normally open switch to close said switch when that heat sensor is exposed to a temperature above a prescribed level, and
    (d) a control element connected to said normally open switch to open said switch after said switch has been closed and said motor has completed one cycle.
6. The statue defined in claim 5 where said prescribed temperature level is about 98° F.
7. The state defined in claim 6 wherein said heat sensor includes a button on said base.

* * * * *